US012717517B2

(12) United States Patent
Shiah

(10) Patent No.: US 12,717,517 B2

(45) **Date of Patent: *Aug. 25, 2026**

(54) MEMORY CONTROLLER FOR REDUCING A PREDETERMINED TIME INTERVAL INSIDE A MEMORY, AND RELATED MEMORY SYSTEM AND MEMORY

(71) Applicant: Etron Technology, Inc., Hsinchu (TW)

(72) Inventor: Chun Shiah, Hsinchu City (TW)

(73) Assignee: Etron Technology, Inc., Hsinchu (TW)

( * ) Notice: Subject to any disclaimer, the term of this patent is extended or adjusted under 35 U.S.C. 154(b) by 3 days.

This patent is subject to a terminal disclaimer.

(21) Appl. No.: 17/213,185

(22) Filed: Mar. 25, 2021

(65) Prior Publication Data

US 2021/0303215 A1 Sep. 30, 2021

Related U.S. Application Data

(60) Provisional application No. 63/000,504, filed on Mar. 27, 2020.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 13/1689; G11C 11/408; G11C 11/4096; G11C 7/1048; G11C 7/1063; G11C 7/109; G11C 8/10; G11C 11/4087
See application file for complete search history.

(56) References Cited

U.S. PATENT DOCUMENTS

2002/0003747 A1* 1/2002 Yahata ..................... G11C 8/18 365/233.1
2003/0191974 A1* 10/2003 Kato ................... G11C 11/4076 713/300
2007/0115750 A1* 5/2007 Lee .......................... G11C 8/10 365/230.06
2008/0056033 A1* 3/2008 Jeong .................. G11C 11/4087 365/225.7
2008/0259696 A1* 10/2008 Merritt ................. G11C 7/1045 711/E12.083
2009/0157983 A1* 6/2009 Bowyer ................... G11C 8/10 711/E12.001
2010/0177587 A1* 7/2010 Huang .................. G11C 11/408 365/230.01
2010/0195426 A1* 8/2010 Yamamoto ............. G11C 29/50 365/201

(Continued)

FOREIGN PATENT DOCUMENTS

CN 1652248 A 8/2005
CN 103927268 A 7/2014

*Primary Examiner* — Charles J Choi
(74) *Attorney, Agent, or Firm* — Winston Hsu

(57) ABSTRACT

A memory controller includes a command processor. When an access command is performed by the memory controller, the command processor generates a column address information to the memory between issuing an active command to the memory and issuing a read or write command to the memory. The column address information and the active command are issued by the command processor based on the access command.

4 Claims, 17 Drawing Sheets

(56) References Cited

U.S. PATENT DOCUMENTS

| | | | | |
|---|---|---|---|---|
| 2013/0265840 | A1* | 10/2013 | Yoshimura | G11C 5/063 365/226 |
| 2014/0068203 | A1* | 3/2014 | Son | G06F 3/068 711/155 |
| 2015/0036424 | A1* | 2/2015 | Ueda | G11C 13/0061 365/158 |
| 2015/0063015 | A1* | 3/2015 | Shimizu | G11C 11/1653 365/158 |
| 2017/0140810 | A1* | 5/2017 | Choi | G11C 11/40618 |
| 2018/0052787 | A1* | 2/2018 | Son | G11C 7/222 |
| 2018/0301188 | A1* | 10/2018 | Choi | G11C 11/2255 |
| 2020/0110714 | A1* | 4/2020 | Richter | G06F 13/4243 |
| 2021/0020213 | A1* | 1/2021 | Mirichigni | G11C 11/2275 |

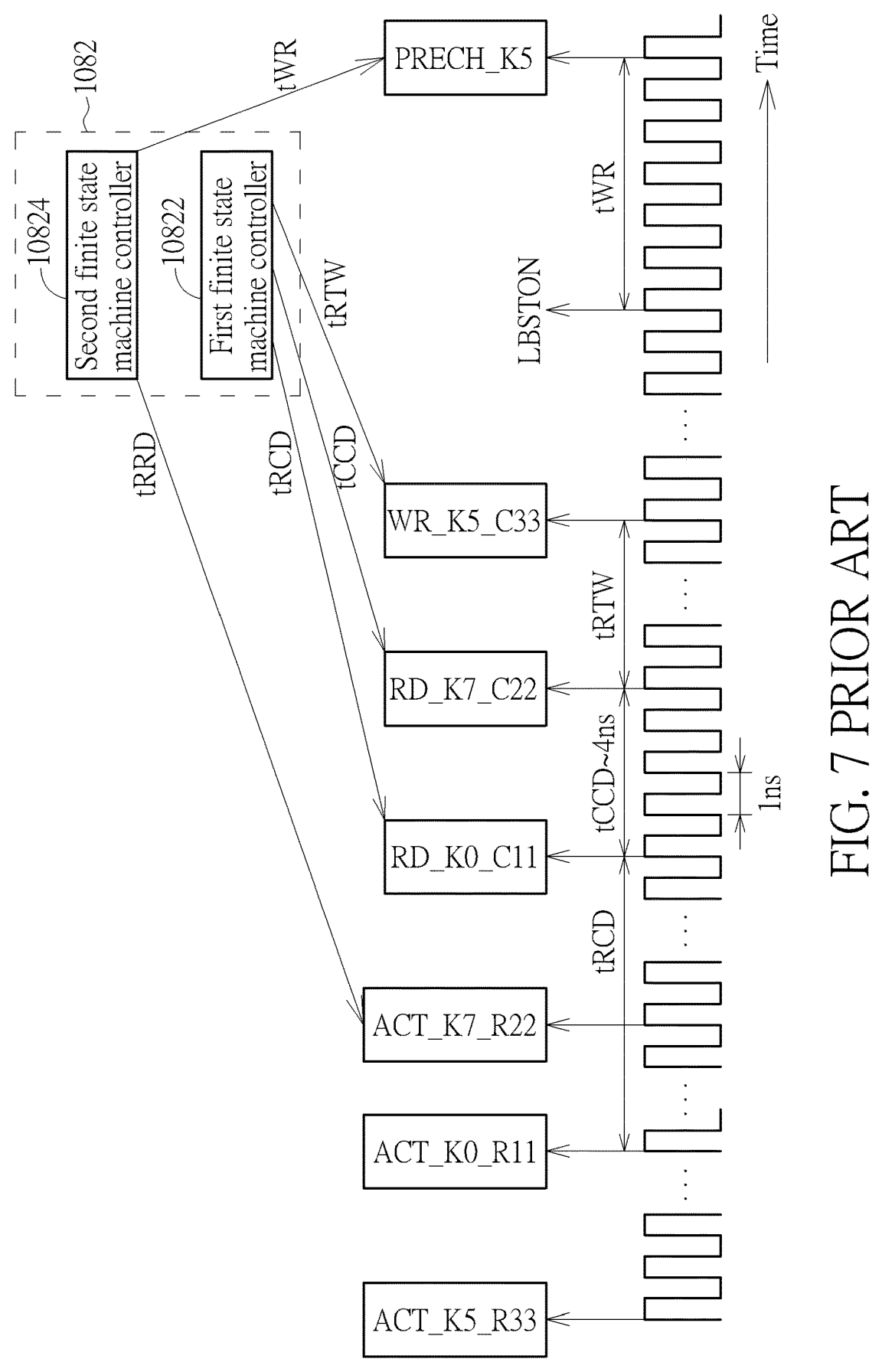

* cited by examiner 1082
10824
Second finite state machine controller
10822
First finite state machine controller
tWR
tRTW
tCCD
tRCD
tRRD
PRECH_K5
LBSTON
WR_K5_C33
RD_K7_C22
RD_K0_C11
ACT_K7_R22
ACT_K0_R11
ACT_K5_R33
tWR
tRTW
tCCD~4ns
tRCD
1ns
Time

FIG. 7 PRIOR ART

MEMORY CONTROLLER FOR REDUCING A PREDETERMINED TIME INTERVAL INSIDE A MEMORY, AND RELATED MEMORY SYSTEM AND MEMORY

CROSS REFERENCE TO RELATED APPLICATIONS

The present invention claims the benefit of U.S. Provisional Application No. 63/000,504, filed on Mar. 27, 2020 and entitled "DRAM System with Pre column address command," the contents of which are incorporated herein by reference.

BACKGROUND OF THE INVENTION

1. Field of the Invention

The present invention relates to a memory controller, a memory, and a memory system, and particularly to a memory controller, a memory, and a memory system that can reduce a time interval between a memory receiving a read or write command and turning on a corresponding bit switch.

2. Description of the Prior Art

Please refer to FIG. 1. FIG. 1 is a diagram illustrating a dynamic random access memory (DRAM) controller 10 according to the prior art. As shown in FIG. 1, one hand of the DRAM controller 10 can be coupled to a plurality of hosts H1-Hn through an advanced eXtensible interface (AXI) bus 102 of the DRAM controller 10, and the other hand of the DRAM controller 10 can be coupled to a plurality of memories M1-Mm through a port physical layer (PHY) interface 112 of the DRAM controller 10, wherein the plurality of memories can be double data rate (DDR~DDR4 or higher)memories, low power DDR (LPDDR-LPDDR4 or higher), etc.

As shown in FIG. 1, the DRAM controller 10 further includes an arbitration and mapping unit 104, a physical queue 106, a sequence engine 108, a command processor 110, and a double data rate PHY interface (DFI) bus 111. The arbitration and mapping unit (or abbreviated as "the arbitration unit") 104 can decide priority of access commands (or commands) generated from the plurality of hosts H1-Hn and mapped from AXI address into memory address. After the priority of the commands is determined, the physical queue 106 can store the commands as a command queue 202 (shown in FIG. 2) according to the priority with mapped address. For example, there are 16 physical queues with 16 commands (C0 to C15), each queue has 36 bits including command bits, bank address, row address, and column address. The stored access command or command may correspond to a read or a write command for 8-bits length from the DRAM (dynamic random access memory) memory. Then, the physical queue 106 can sequentially transmit the commands C0-C15 to the sequencing engine 108. For example, the physical queue 106 can sequentially transmit the commands C0-C2 to registers FIFOO0-FIFOO2 (shown in FIG. 3) of the sequencing engine 108, that is, the commands C0-C2 are sequentially stored in the registers FIFOO0-FIFOO2, respectively. In addition, as shown in FIG. 3, a finite state machine 1082 included in the sequencing engine 108 executes the commands C0-C2 stored in the registers FIFOO0-FIFOO2 according to a sequence corresponding to the registers FIFOO0-FIFOO2. For example, the finite state machine 1082 first executes the command C0 (having sequence 1) stored in the register FIFOO0, and then sequentially executes the command C1 (having sequence 2) stored in the register FIFOO1 and the command C2 (having sequence 3) stored in the register FIFOO2. The command processor 110 also processes the command C0, and sequentially processes the command C1 and the command C2, wherein an operational timing of the command processor 110 processing the command C0, the command C1, and the command C2 can be referred to FIG. 4. As shown in FIG. 4, taking the memory M1 as an example, the command C0 could correspond to a read command (or a write command) with a column 11 and a row 11 of a bank 0, the command C1 could correspond to a read command (or a write command) with a column 22 and a row 22 of a bank 7, the command C2 could correspond to a read command (or a write command) with a column 33 and a row 33 of a bank 5. When the finite state machine 1082 executes the command C0, the finite state machine 1082 can first check if the row 11 of the bank 0 is activated. If the row 11 of the bank 0 is inactivated and another row of the bank 0 is activated, the finite state machine 1082 enters a pre-charge state and controls the command processor 110 to generate a pre-charge command PRECH_K0 (at a time t1 shown in FIG. 4). As shown in FIG. 4, after a time interval tRP (defined in JEDEC double data rate memory specification) following the command processor 110 generating the pre-charge command PRECH_K0, the command processor 110 can execute the active command ACT_K0_R11 to select the row 11 of the bank 0 (at a time t4 shown in FIG. 4). The address of row 11 accompanying the active command ACT_K0_R11 will also be received by the memory at the same time. After a time interval tRCD (defined in JEDEC double data rate memory specification) following the command processor 110 generating the active command ACT_K0_R11, the command processor 110 can execute a read command RD_K0_C11 to select the column 11 of the bank 0 (at a time t6 shown in FIG. 4). The address of the column 11 accompanying the read command RD_K0_C11 will be also received by the memory M1 at the same time. After the memory M1 receives the read command RD_K0_C11, a datum stored in a memory cell coupled to the row 11 and the column 11 of the bank 0 of the memory M1 will be read (or if the memory M1 receives the write command WR_K0_C11 (not shown in FIG. 4), a datum will be written into the memory cell coupled to the row 11 and the column 11 of the bank 0 of the memory M1).

During the time interval tRP and time interval tRCD, the command processor 110 could process portion of the command C1 and/or the command C2 based on some look ahead rules. For example, before the active command ACT_K0_R11 corresponding to the command C0 is generated, the finite state machine 1082 could control the command processor 110 to generate a pre-charge command PRECH_K7 corresponding to the command C1 (at a time t2 shown in FIG. 4) and later generate an active command ACT_K5_R33 corresponding to the command C2 (at a time t3 shown in FIG. 4). Furthermore, during the time interval of tRCD, the finite state machine 1082 could controls the command processor 110 to generate an active command ACT_K7_R22 corresponding to the command C1 (at a time t5 shown in FIG. 4). To be mentioned, unlike the command C0 and C1, there is no pre-charge command corresponding to the command C2 issued by the command processor 110 during t1-t3 in this case, because the bank 5 to be read (or written) according to the command C2 may be already pre-charged (or be executed by an auto-refresh command, or a pre-charge all command) before the time t1. In addition, when the read command RD_K0_C11 of the command C0 is issued, the command C1 stored in the register FIFOO1 will be moved to the register FIFOO0, the command C2 stored in the register FIFOO2 will be moved to the register FIFOO1l, and the register FIFOO2 can get one new command (e.g. the command C3) from the command queue 202 in the physical queue 106.

In addition, please refer to FIG. 5. FIG. 5 is a diagram illustrating an operational timing of the command processor 110 issuing the active commands ACT_K0_R11, ACT_K5_R33, ACT_K7_R22 and the read commands RD_K0_C11, RD_K7_C22, RD_K5_C33 according to the prior art. As shown in FIG. 5, the time interval tRCD needs to exist between the active command ACT_K0_R11 and the read command RD_K0_C11 (that is, a time interval between the active command ACT_K0_R11 and the read command RD_K0_C11 is not less than the time interval tRCD), and a time interval tCCD (defined in JEDEC double data rate memory specification) needs to exist between the read command RD_K0_C11 and the read command RD_K7_C22 (that is, a time interval between the read command RD_K0_C11 and the read command RD_K7_C22 is not less than the time interval tCCD), wherein in JEDEC double data rate memory specification, when one clock period of an inner clock applied to the plurality of memories M1-Mm is equal to 1 ns, the time interval tCCD is not less than 4 ns. In addition, the time interval tCCD also needs to exist between the read command RD_K7_C22 and the read command RD_K5_C33. In addition, when the command processor 110 sequentially processes the command C3, the command processor 110 can issue a read command RD_K6_C44 according to the command C3, wherein as shown in FIG. 5, a time interval tCCD (11 ns) between the read command RD_K6_C44 and the read command RD_K5_C33 is greater than 4 ns.

Next, please refer to FIG. 6. FIG. 6 is a diagram illustrating a data structure of the command and a read or write command generating circuit 1101 in the command processor 110 according to the prior art. As shown in FIG. 6(*a*), taking the command C0 as an example again, the command C0 has 36 bits B0-B35, wherein the bits B0-B10 store column address data CAD, the bits B11-B26 store row address data RAD, the bits B27-B29 store bank address data BAD, the bits B32-B34 store a command code CC, and the bits B30, B31, B35 are reserved bits. For example, the column address data CAD represent a column 11, the row address data RAD represent the row 11, the bank address data BAD represent the bank 0 of the memory M1, and the command code CC represents the command C0 corresponding to a read command (i.e. the read command RD_K0_C11). In addition, a data structure of each of the commands C1, C2 is the same as one of the command C0, so further description thereof is omitted for simplicity. As shown in FIG. 6(*b*), the read or write command generating circuit 1101 can generate the read command RD_K0_C11 according to the bank address data BAD, the column address data CAD, and/or a read or write command sure signal RWSS, wherein the bank address data BAD, the column address data CAD could be transmitted from the sequencing engine 108. In addition, the command processor 110 can transmit the read command RD_K0_C11 to the memory M1 through the DFI bus 111 and the PHY interface 112.

Next, please refer to FIG. 7. FIG. 7 is a diagram illustrating an operational timing of the finite state machine 1082 controlling the command processor 110 according to the prior art. As shown in FIG. 7, in regard to the read commands RD_K0_C11, RD_K7_C22 and a write command WR_K5_C33, when a first finite state machine controller 10822 included in the finite state machine 1082 controls the command processor 110 to issue the read commands RD_K0_C11, RD_K7_C22 and the write command WR_K5_C33, the time interval tRCD shall be satisfied between the command processor 110 issuing the active command ACT_K0_R11 and the read command RD_K0_C11, the time interval tCCD shall be satisfied between the command processor 110 issuing the read command RD_K0_C11 and the read command RD_K7_C22, and a time interval tRTW (defined in JEDEC double data rate memory specification) shall be satisfied between the command processor 110 issuing the read command RD_K7_C22 and the write command WR_K5_C33. In addition, as shown in FIG. 7, in regard to the active commands ACT_K5_R33, ACT_K0_R11, ACT_K7_R22 and a pre-charge command PRECH_K5, when a second finite state machine controller 10824 included in the finite state machine 1082 controls the command processor 110 to issue the active commands ACT_K5_R33, ACT_K0_R11, ACT_K7_R22 and the pre-charge command PRECH_K5, a time interval tRRD (defined in JEDEC double data rate memory specification) shall be satisfied between the command processor 110 issuing two different active commands, and a time interval tWR (defined in JEDEC double data rate memory specification) shall be satisfied before the command processor 110 issuing the pre-charge command PRECH_K5, wherein as shown in FIG. 7, the time interval tWR exists between the pre-charge command PRECH_K5 and turning-on time LBSTON of a last bit switch corresponding to the write command WR_K5_C33.

As shown in FIG. 8, taking the command C0 as an example again, after the memory M1 receives the read command RD_K0_C11, a time interval T1 is for a decoder 802 of the memory M1 receiving and decoding the read command RD_K0_C11, wherein the decoder 802 operates according to a clock CLK(RD or WR) applied to the memory M1. Thereafter, a time interval T2 (i.e. delay chain) is for a column address latch 806 latching/outputting an address of the column 11 and for a column redundancy comparison 808 and a column address pre-decoder 810 being ready according to the address of the column 11 and a bit-switch enabling signal BS_ENABLE_PLS generated by the decoder 802. Then, a time interval T3 is for a column bit-switch decoder 812 decoding a corresponding bit switch according to the address of the column 11. In addition, as shown in FIG. 8, an address XADD[0:N] includes an address of the bank 0, an address of the row 11, and the address of the column 11, and an address latch 804 is used for latching the address of the bank 0, the address of the row 11, and the address of the column 11, wherein the address latch 804 also operates according to the clock CLK(RD or WR).

However, as shown in FIG. 4, in the command processor 110, the command C0 already includes address information of the column 11 and the row 11 of the bank 0, the command C1 also includes address information of the column 22 and the row 22 of the bank 7, and the command C2 also includes address information of the column 33 and the row 33 of the bank 5 as well. In addition, as shown in FIG. 4, because unoccupied time still exists between the active command ACT_K0_R11 and the read command RD_K0_C11 of the command C0 and the address of the column 11 stored in the register FIFOO0 is already known, how to utilize the unoccupied time and the known address of the column 11 to delete the time interval T2 (i.e. the delay chain) has become an important issue for a designer of the DRAM controller 10.

SUMMARY OF THE INVENTION

The present invention provides a memory controller, a memory, and a related memory system. The memory controller can generate a pre-column address command to the memory between issuing a read or write command and issuing an active command, so that compared to the prior art, the memory can utilize the pre-column address command to rapidly turn on a corresponding bit switch.

An embodiment of the present invention provides a memory controller for a memory. The memory controller includes a command processor. When an access command is performed by the memory controller, the command processor generates a column address information to the memory before issuing a read or write command to the memory, wherein the column address information and the read or write command are issued based on the access command.

According to another aspect of the present invention, the command processor generates the column address information to the memory between issuing an active command and issuing the read or write command, wherein the active command is issued based on the access command.

According to another aspect of the present invention, the command processor further issues a pre-charge command based on the access command before issuing the active command.

According to another aspect of the present invention, the command processor further issues a pre-column address command to the memory before the memory receives the read or write command, the pre-column address command is issued by the command processor based on the access command, and a predetermined time exists between the pre-column address command and the read or write command.

According to another aspect of the present invention, the column address information and the pre-column address command are generated to the memory within a clock period, or simultaneously generated to the memory.

According to another aspect of the present invention, the pre-column address command and the column address information corresponding to the access command are issued after issuing another read or write command corresponding to another access command which is performed by the memory controller right before the access command.

According to another aspect of the present invention, the memory controller further includes a sequencing engine, wherein the sequencing engine is coupled to the command processor, the access command is stored in the sequencing engine, and the sequencing engine controls the command processor to sequentially generate the column address information and the read or write command according to the access command.

Another embodiment of the present invention provides a memory, wherein the memory is capable to receive an access command from a memory controller. The memory includes a first decoder. The first decoder is configured to decode a read or write corresponding to the access command; wherein a column address information corresponding to the access command is received by the memory before the read or write command is received by the memory.

According to another aspect of the present invention, the memory further includes a second decoder, wherein the second decoder is configured to decode an active command corresponding to the access command, and the column address information is received by the memory at a clock falling edge or a clock rising edge after the active command is received by the memory.

According to another aspect of the present invention, the memory further includes a third decoder, wherein the third decoder is configured to decode a pre-column address command corresponding to the access command, and the pre-column address command is received by the memory before the memory receives the read or write command.

According to another aspect of the present invention, the column address information and the pre-column address command are received by the memory within a clock period, or simultaneously received by the memory.

According to another aspect of the present invention, the memory further includes a column address latch, wherein the third decoder decodes the pre-column address command and generates a latch signal to the column address latch to latch the column address information before the memory receives the read or write command.

According to another aspect of the present invention, the memory further includes a fourth decoder, wherein the fourth decoder is configured to decode a pre-charge command corresponding to the access command, and a row address information is received by the memory after the pre-charge command is received by the memory and before the active command is received by the memory.

According to another aspect of the present invention, the row address information and a pre-row address command are received by the memory within a clock period, or simultaneously received by the memory.

According to another aspect of the present invention, the memory further includes a fifth decoder, wherein the fifth decoder is configured to decode the pre-row address command corresponding to the access command, and the pre-row address command is received by the memory before the memory receives the active command.

According to another aspect of the present invention, the memory further includes a row address latch, wherein the fifth decoder decodes the pre-row address command and generates a latch signal to the row address latch to latch the row address information before the memory receives the active command.

Another embodiment of the present invention provides a memory system. The memory system includes a memory controller and a memory. The memory is coupled to the memory controller. When an access command is performed by the memory controller, the command processor generates a column address information to the memory before issuing a read or write command to the memory; wherein the column address information and the read or write command are issued by the command processor based on the access command.

According to another aspect of the present invention, the command processor further issues a pre-column address command to the memory to latch the column address information before the memory receives the read or write command.

According to another aspect of the present invention, the column address information and the pre-column address command are generated to the memory within a clock period, or simultaneously generated to the memory.

According to another aspect of the present invention, the pre-column address command and the column address information corresponding to the access command are issued by the memory controller after issuing another read or write command corresponding to another access command which is performed by the memory controller right before the access command.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram illustrating an operational timing of the finite state machine controlling the command processor according to the prior art.

DETAILED DESCRIPTION

Figure 1:
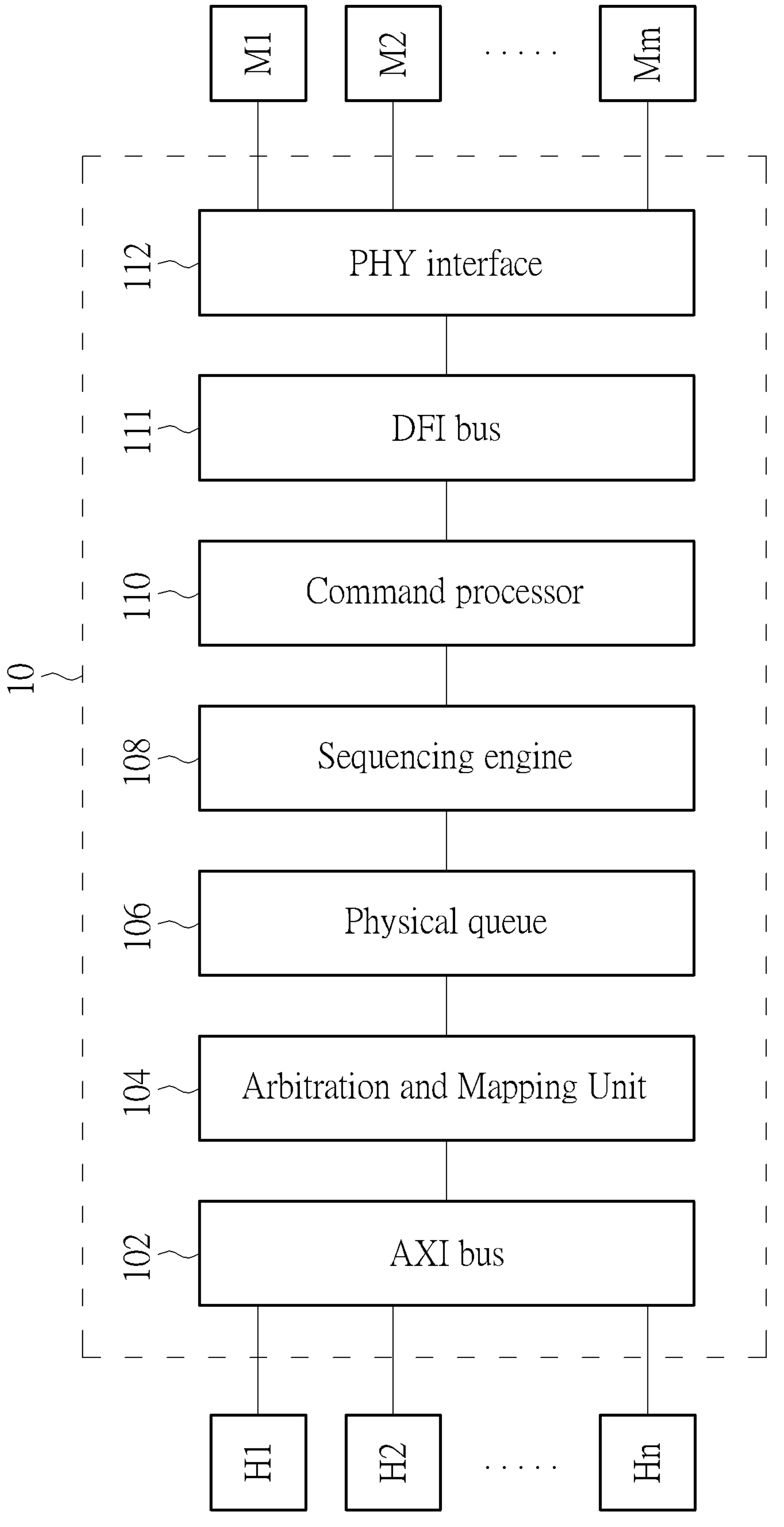
FIG. 1 is a diagram illustrating a memory controller according to the prior art.
Figure 2:
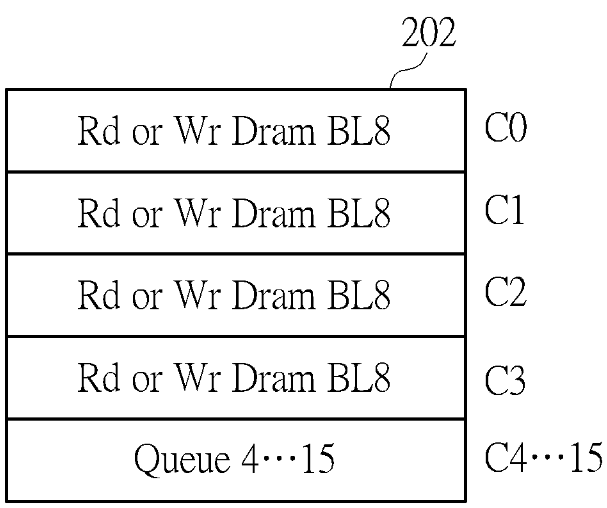
FIG. 2 is a diagram illustrating the command queue.
Figure 3:
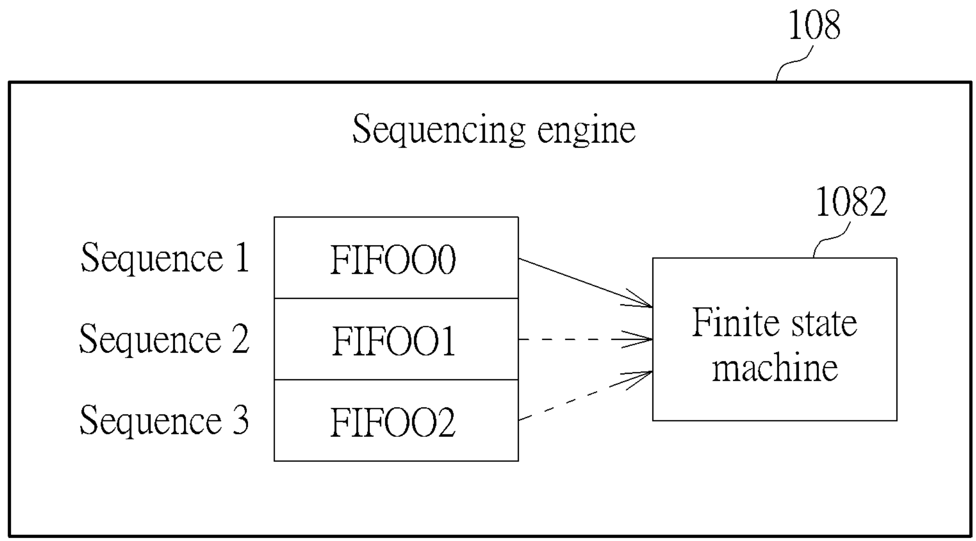
FIG. 3 is a diagram illustrating the sequencing engine.
Figure 4:
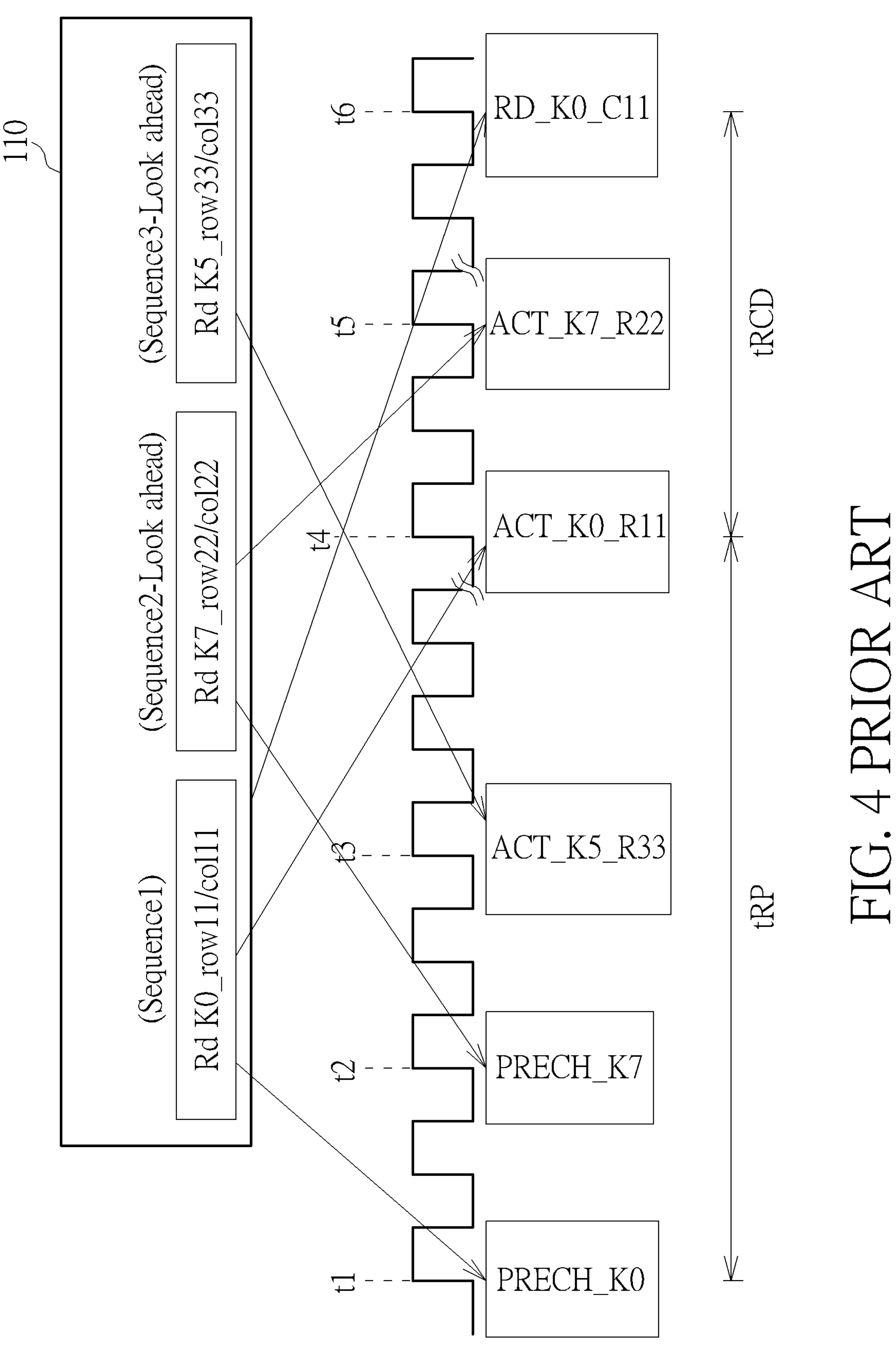
FIG. 4 is a diagram illustrating the operational timing of the command processor of the memory controller according to the prior art.
Figure 9:
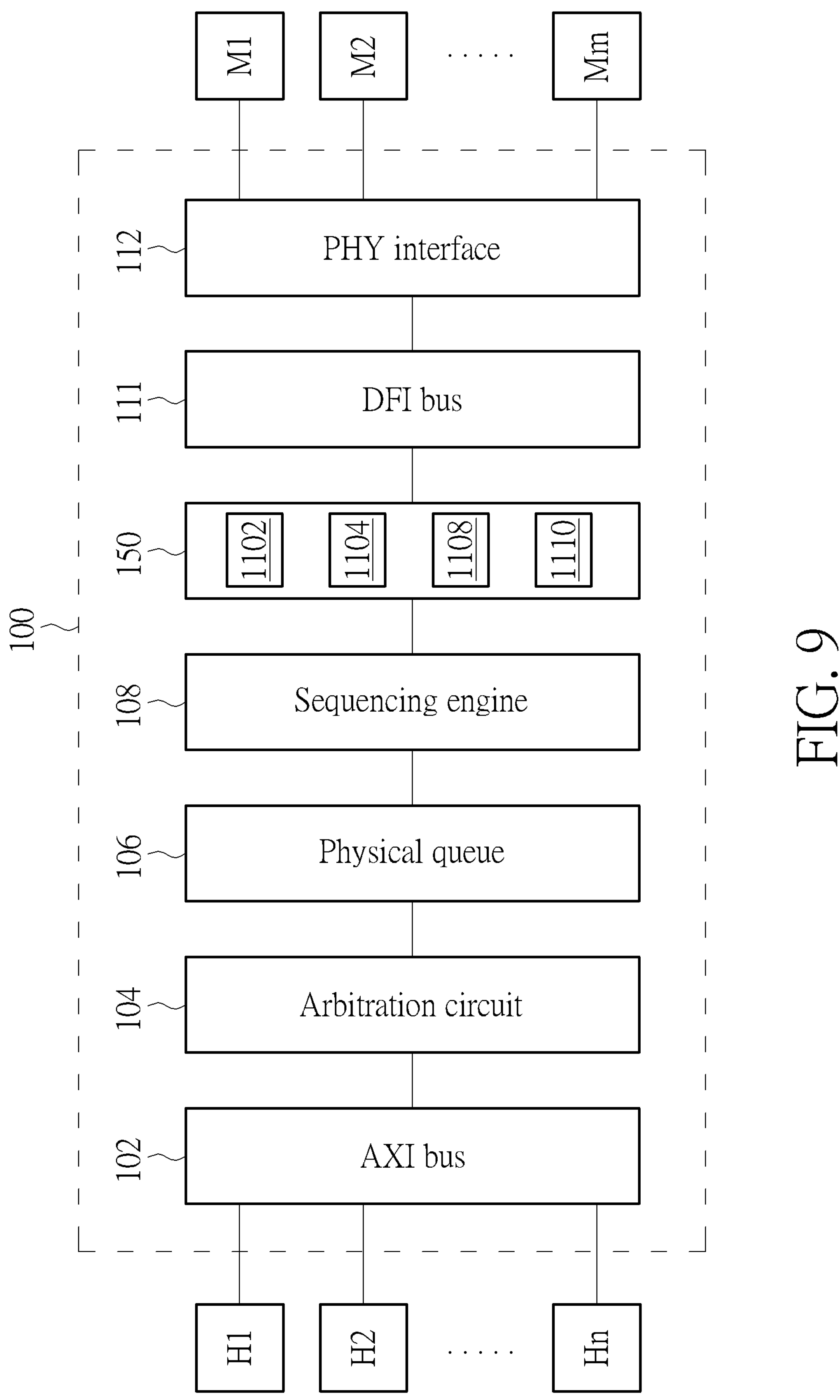
FIG. 9 is a diagram illustrating a memory controller according to an embodiment of the present invention.

Please refer to FIG. 9. FIG. 9 is a diagram illustrating a memory controller 100 according to an embodiment of the present invention. As shown in FIG. 9, the memory controller 100 at least includes an advanced eXtensible interface (AXI) bus 102, an arbitration circuit 104, a physical queue 106, a sequencing engine 108, a command processor 150, a double data rate PHY interface (DFI) bus 111, and a port physical layer (PHY) interface 112, wherein the AXI bus 102, the arbitration circuit 104, the physical queue 106, the sequencing engine 108, the DFI bus 111, and the PHY interface 112 shown in FIG. 9 are the same as those of the DRAM controller 10 shown in FIG. 1, so further description thereof is omitted for simplicity. In addition, a difference between the memory controller 100 and the DRAM controller 10 is that the command processor 150 in FIG. 9 is different from the command processor 110 in FIG. 1. In addition, coupling relationships between the AXI bus 102, the arbitration circuit 104, the physical queue 106, the sequencing engine 108, the command processor 150, the DFI bus 111, and the PHY interface 112 can be referred to FIG. 9, so further description thereof is also omitted for simplicity. In addition, other circuits included in the memory controller 100 except the above-mentioned elements are not the technical features which the present invention focuses on, so further description thereof is also omitted for simplicity.

Figure 6:
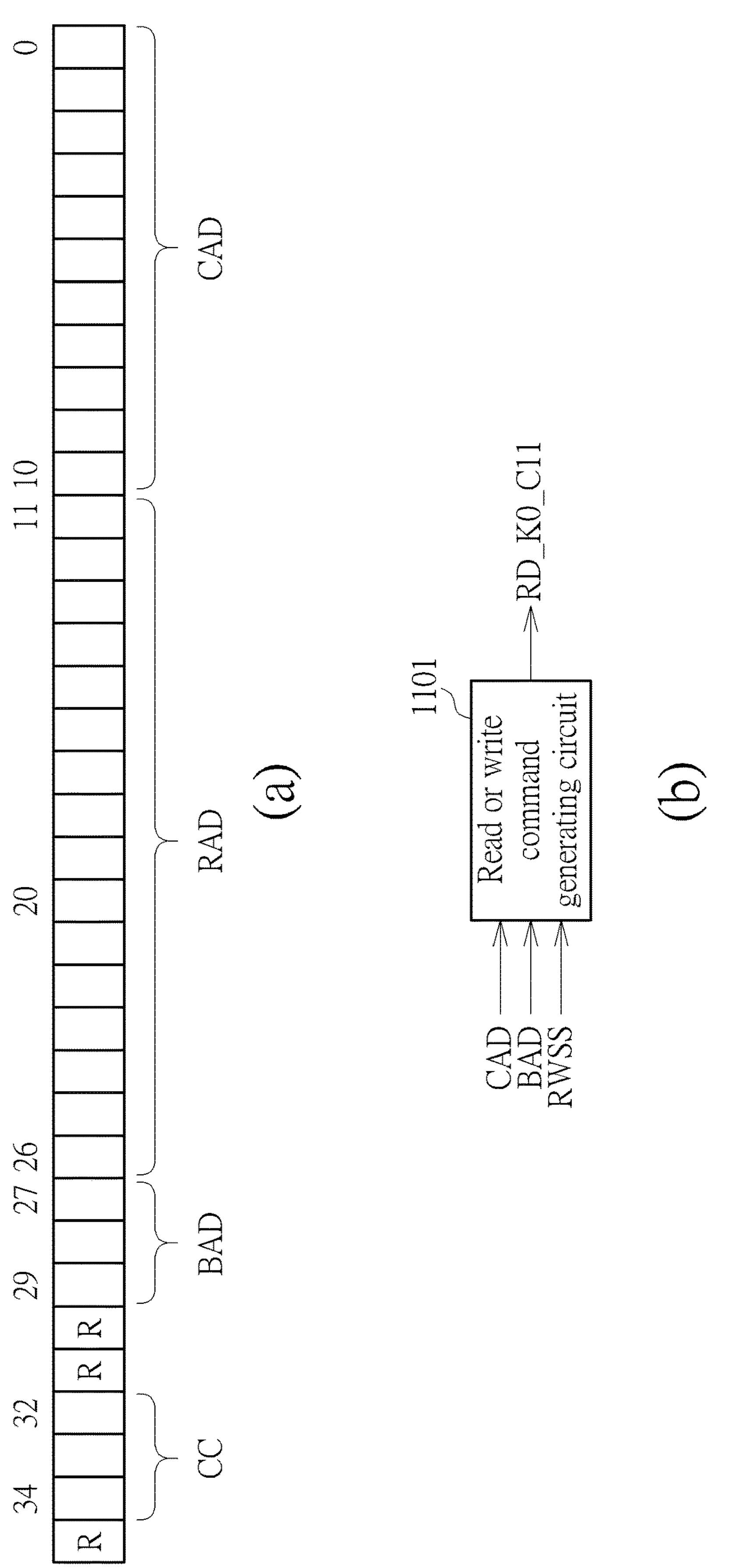
FIG. 6 is a diagram illustrating a data structure of the command and a read or write command generating circuit in the command processor according to the prior art.

In addition, a data structure of each command of the commands C0-C2 in the registers (such as, FIFOO0-FIFOO2) of the sequencing engine 108 can be referred to FIG. 6(*a*), so further description thereof is omitted for simplicity. Therefore, when the command processor 150 begins to execute the command C0, all addresses, including the row address data RAD and the column address data CAD, are already stored in the sequencing engine 108 and available to be transmitted to the command processor 150.

Figure 10A:
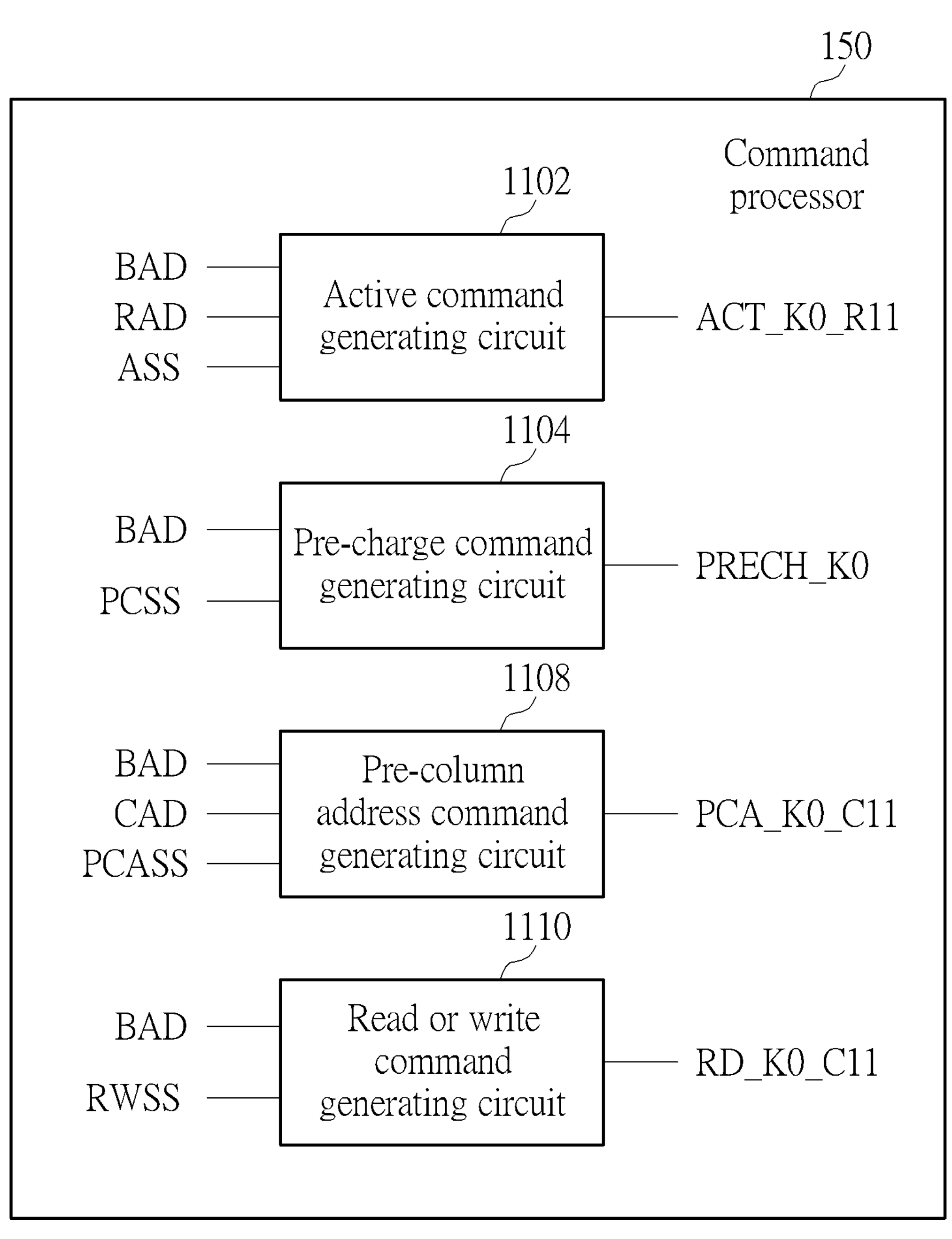
FIGS. 10A, 10B are diagrams illustrating the command processor.
Figure 10B:
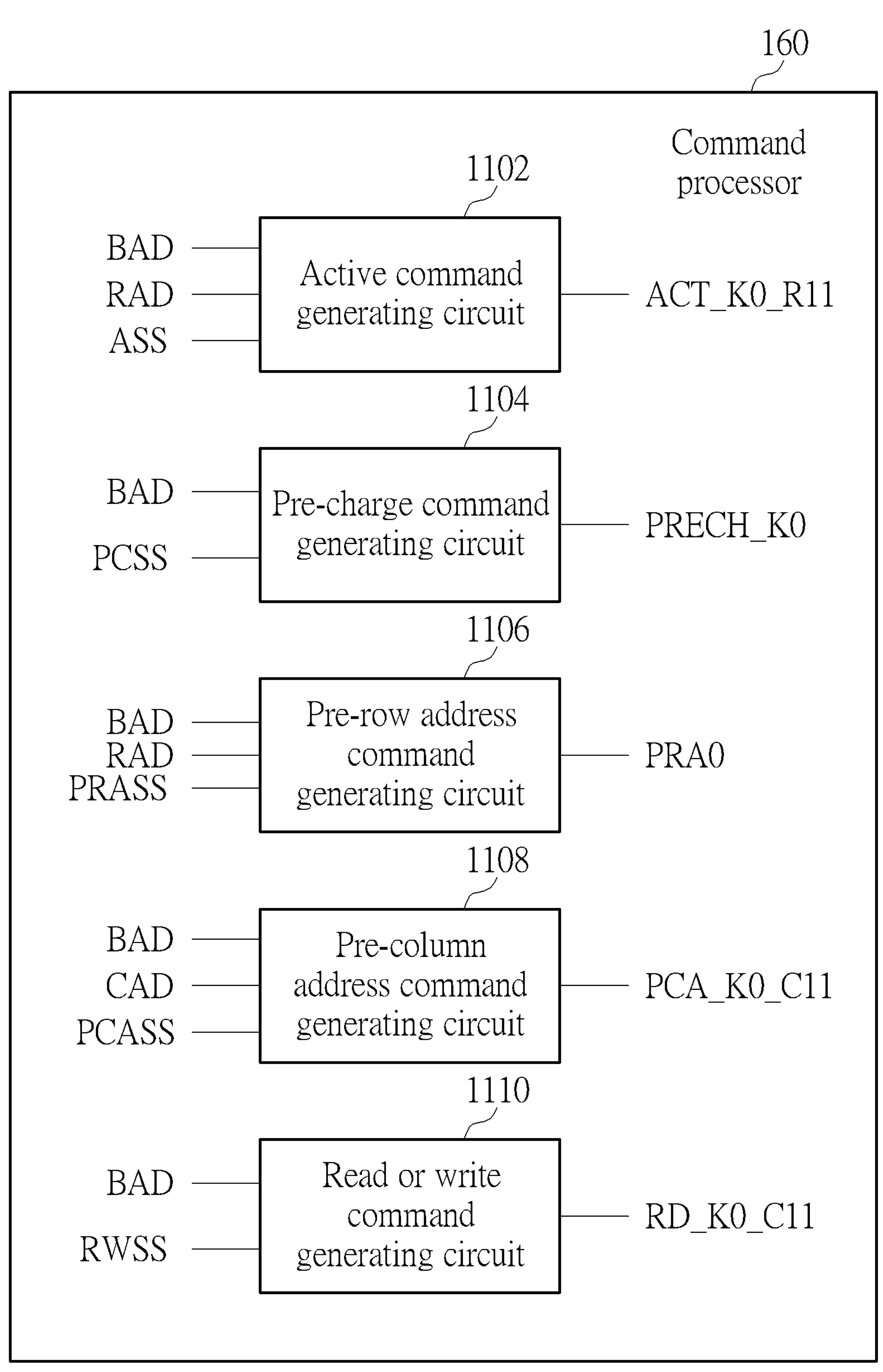

In addition, please refer to FIGS. 10A, 10B. FIG. 10A is a diagram illustrating the command processor 150 and FIG. 10B is a diagram illustrating a command processor 160. As shown in FIG. 10A, the command processor 150 includes an active command generating circuit 1102, a pre-charge command generating circuit 1104, a pre-column address command generating circuit 1108, and a read or write command generating circuit 1110. Now, taking the command C0 as an example again, the active command generating circuit 1102 can generate an active command ACT_K0_R11 according to the bank address data BAD of the bank 0 of the memory M1, the row address data RAD of the bank 0, and an active sure signal ASS, wherein the bank address data BAD and the row address data RAD could be transmitted from the sequencing engine 108; the pre-charge command generating circuit 1104 can generate a pre-charge command PRECH_K0 according to the bank address data BAD and a pre-charge sure signal PCSS, wherein the bank address data BAD is transmitted from the sequencing engine 108; the pre-column address command generating circuit 1108 can generate a pre-column address command PCA_K0_C11 according to the bank address data BAD, the column address data CAD, and a pre-column address sure signal PCASS, wherein the bank address data BAD, the column address data CAD could be transmitted from the sequencing engine 108; and the read or write command generating circuit 1110 can generate the read command RD_K0_C11 according to the bank address data BAD and the read or write command sure signal RWSS, wherein the bank address data BAD could be transmitted from the sequencing engine 108. In addition, the command processor 150 can transmit the pre-charge command PRECH_K0, the pre-column address command PCA_K0_C11, the read command RD_K0_C11, and the active command ACT_K0_R11 to the memory M1 through the DFI bus 111 and the PHY interface 112. In addition, in another embodiment of the present invention (shown in FIG. 10B), a difference between the command processor 160 and the command processor 150 is that the command processor 160 further includes a pre-row address command generating circuit 1106, wherein the pre-row address command generating circuit 1106 can generate a pre-row address command PRA0 according to the bank address data BAD, the row address data RAD, and a pre-row address sure signal PRASS, wherein the bank address data BAD and the row address data RAD could be transmitted from the sequencing engine 108. In addition, the command processor 160 can transmit the pre-row address command PRA0, the pre-charge command PRECH_K0, the pre-column address command PCA_K0_C11, the read command RD_K0_C11, and the active command ACT_K0_R11 to the memory M1 through the DFI bus 111 and the PHY interface 112, wherein the command processor 160 issues the pre-row address command PRA0 before the command processor 160 issues the active command ACT_K0_R11.

In one embodiment, the command C0 stored in the register FIFOO0 corresponds to sequence 1, the command C1 stored in the register FIFOO1 corresponds to sequence 2, and the command C2 stored in the register FIFOO2 corresponds to sequence 3. The finite state machine 1082 of the sequencing engine 108 can control the command processor 150 to execute the command C0, and meanwhile look ahead the command C1 and the command C2 to efficiently transmit available address information to the command processor 150 to generate the pre-column address command PCA_K0_C11 and/or the pre-row address command PRA0 at suitable time.

Figure 5:
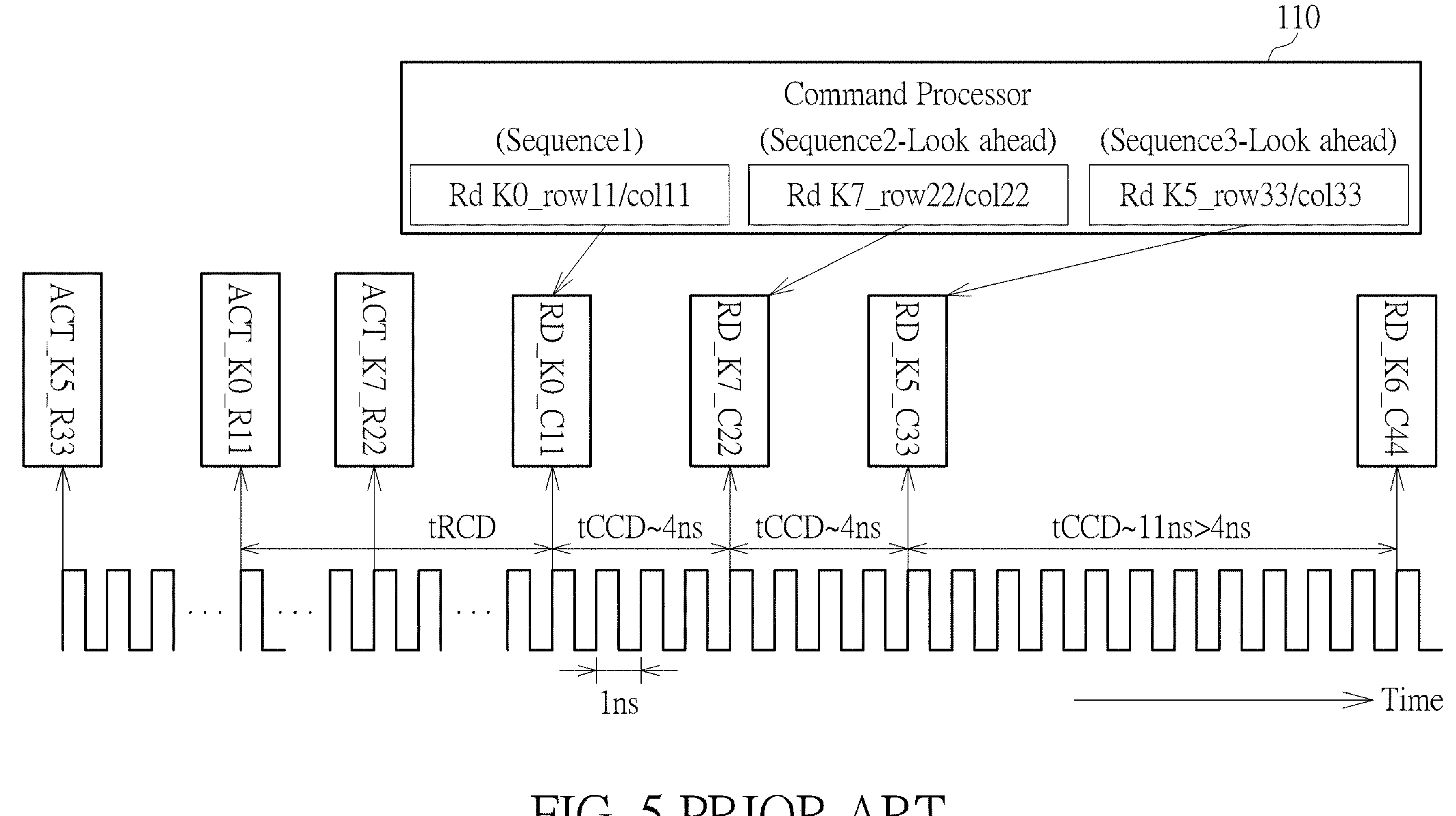
FIG. 5 is a diagram illustrating the operational timing of the command processor issuing the active commands and the corresponding read commands following the operational timing shown in FIG. 4 according to the prior art.
Figure 11:
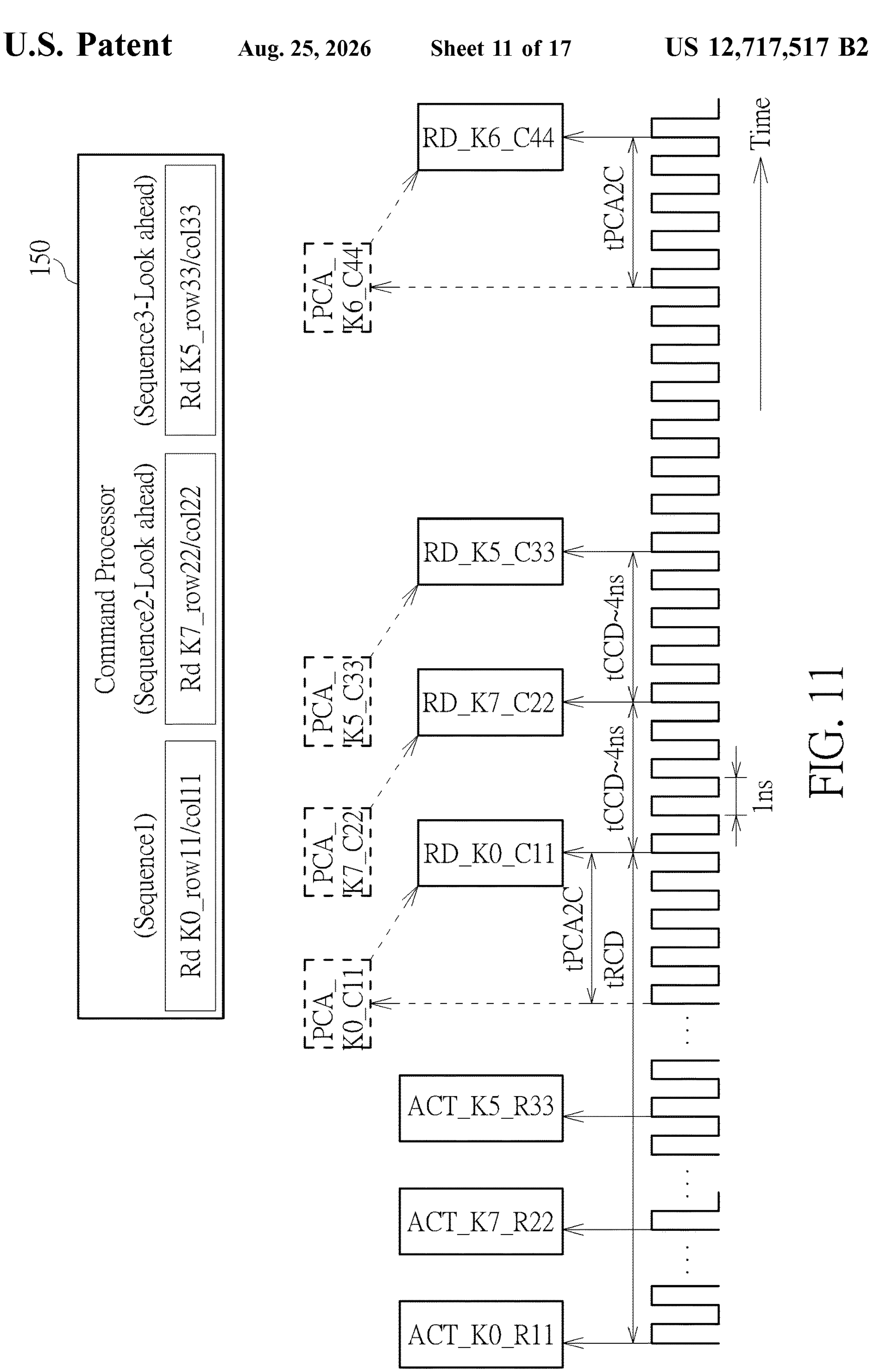
FIGS. 11-14 are diagrams illustrating the operational timing of the command processor issuing the active commands and the corresponding read commands according to the present invention.

Each command (e.g. the command C0, the command C1, or the command C2) in the present invention could correspond to a read command or a write command, and in the following only read command will be discussed as example. As shown in FIG. 11, taking the command C0 corresponding to read of the memory cell coupled to the column 11 and row 11 in the bank 0, the command C1 corresponding to read of the memory cell coupled to the column 22 and row 22 of in the bank 7, the command C2 corresponding to read of the memory cell coupled to the column 33 and row 33 of in the bank 5 as an example, a difference between FIG. 11 and FIG. 5 is that because the command C0 includes column address information (i.e. the column 11), the finite state machine 1082 can further control the command processor 150 to issue the pre-column address command PCA_K0_C11 between the command processor 150 issuing the active command ACT_K0_R11 and the read command RD_K0_C11, wherein the command processor 150 can issue the pre-column address command PCA_K0_C11 at a clock falling edge or a clock rising edge of the inner clock applied to the plurality of memories M1-Mm. For example, the command processor 150 can issue the pre-column address command PCA_K0_C11 to the memory M1 before the command processor 150 issuing the read command RD_K0_C11 to the memory M1, wherein a predetermined time (i.e. a time interval tPCA2C) exists between the pre-column address command PCA_K0_C11 and the read command RD_K0_C11, and in one embodiment of the present invention, the time interval tPCA2C would not be less than 4 clock periods (4clks) of the inner clock applied to the plurality of memories M1-Mm. Therefore, according to the operational timing shown in FIG. 11, because the command processor 150 can issue the pre-column address command PCA_K0_C11 with column 11 address information before the command processor 150 issuing the read command RD_K0_C11, the memory M1 can first decode the column 11 address information according to the pre-column address command PCA_K0_C11 before receiving the read command RD_K0_C11, resulting in saving of 2 ns in read access time (e.g. CAS latency defined in JEDEC double data rate memory specification) or write recovery time (e.g. tWR defined in JEDEC double data rate memory specification). Similarly, as shown in FIG. 11, the command processor 150 can issue a pre-column address command PCA_K7_C22 with column 22 address information before the command processor 150 issuing the read command RD_K7_C22, wherein the time interval tPCA2C exists between the pre-column address command PCA_K7_C22 and the read command RD_K7_C22; the command processor 150 can issue a pre-column address command PCA_K5_C33 with column 33 address information before the command processor 150 issuing the read command RD_K5_C33, wherein the time interval tPCA2C exists between the pre-column address command PCA_K5_C33 and the read command RD_K5_C33; and the command processor 150 can issue a pre-column address command PCA_K6_C44 with column 44 address information before the command processor 150 issuing the read command RD_K6_C44, wherein the time interval tPCA2C exists between the pre-column address command PCA_K6_C44 and the read command RD_K6_C44.

In addition, in JEDEC double data rate memory specification, pins A0-A13 of the memory M1 can be utilized to decode address information, but the pins A13, A11 are not used in decoding column address information originally, so in the present invention, the pin A13 (or the pin A11, or the pins A13, A11) of the memory M1 can be utilized to decode column address information included in the pre-column address commands PCA_K0_C11, PCA_K7_C22, PCA_K5_C33, wherein in one embodiment the column address information included in the pre-column address commands PCA_K0_C11, PCA_K7_C22, PCA_K5_C33 corresponding to the pins A0-A9 of the memory M1. But, the present invention is not limited to the memory M1 utilizing the above-mentioned pin configurations to decode the column address information included in the pre-column address commands PCA_K0_C11, PCA_K7_C22, PCA_K5_C33.

Figure 12:
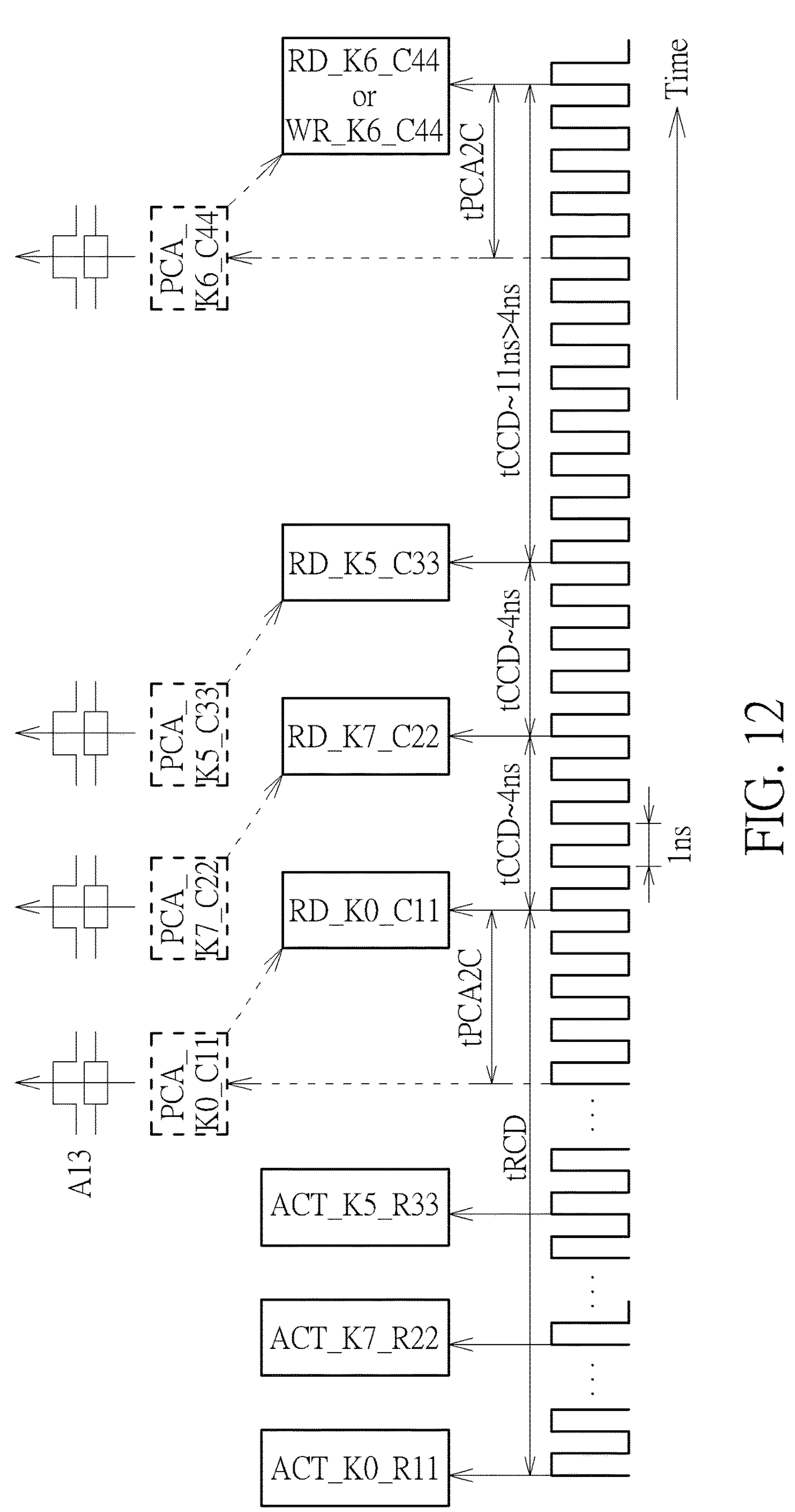

Next, taking the pin A13 as an example, as shown in FIG. 12, when the A13 of the address information is high, the command processor 150 could issue the pre-column address commands PCA_K0_C11, PCA_K7_C22, PCA_K5_C33 or PCA_K6_C44, as shown in FIG. 12, wherein the issued pre-column address commands PCA_K0_C11, PCA_K7_C22, and/or PCA_K5_C33, correspond to the read commands RD_K0_C11, RD_K7_C22, RD_K5_C33 respectively, and the pre-column address command PCA_K6_C44 corresponds to a read command RD_K6_C44 (or a write command WR_K6_C44). A time interval between one pre-column address command and a corresponding read command is not less than the time interval tPCA2C, and a time interval between one read command and an adjacent read command is not less than the time interval tCCD.

In addition, the present invention is not limited to the pre-column address command generating circuit 1108 of the command processor 150 generating the pre-column address command PCA_K0_C11 at the clock falling edge or the clock rising edge between the active command ACT_K0_R11 and the read command RD_K0_C11. That is, any configuration in which the pre-column address command generating circuit 1108 generates the pre-column address command PCA_K0_C11 before the read command RD_K0_C11 falls within the scope of the present invention.

Figure 13:
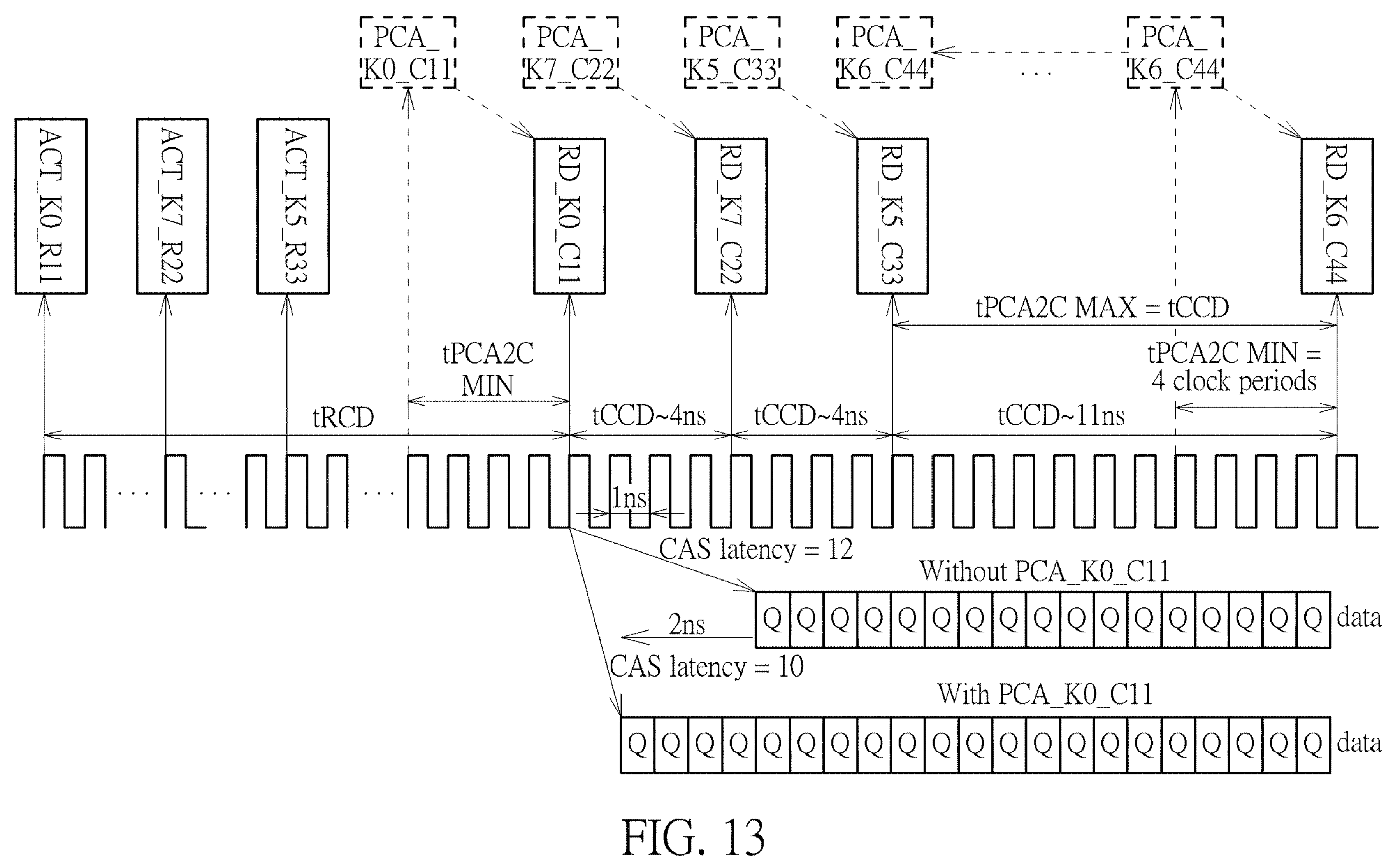

In addition, taking the command processor 150 issuing the pre-column address command PCA_K6_C44 as an example, as shown in FIG. 13, in one embodiment of the present invention, in the event the pre-column address command PCA_K6_C44 cannot exceed a previous read command (i.e. the read command RD_K5_C33), so a maximum tPCA2CMAX of the time interval tPCA2C between the pre-column address command PCA_K6_C44 and the read command RD_K6_C44 is equal to the time interval tCCD (e.g. as shown in FIG. 13, the time interval tCCD between the pre-column address command PCA_K6_C44 and the read command RD_K6_C44 is equal to 11 clocks or 11 ns) and a minimum tPCA2CMIN of the time interval tPCA2C between the pre-column address command PCA_K6_C44 and the read command RD_K6_C44 could be equal to 4 clock periods (4clks) of the inner clock. In addition, as shown in FIG. 13, taking the pre-column address command PCA_K0_C11 as an example, with the pre-column address command PCA_K0_C11, the memory M1 can improve about 2 ns in read access time by JEDEC MRS (mode register set) setting (for example, the CAS latency "CL" setting in mode register could be changed a from 12 to 10). Of course, when the pre-column address command PCA_K0_C11 corresponds to a write command, the memory M1 can improve about 2 ns in write recovery time by JEDEC MRS setting (for example, the "WR" setting in mode register could be changed from 12 to 10) In addition, symbol Q shown in FIG. 13 represents a datum.

Figure 14:
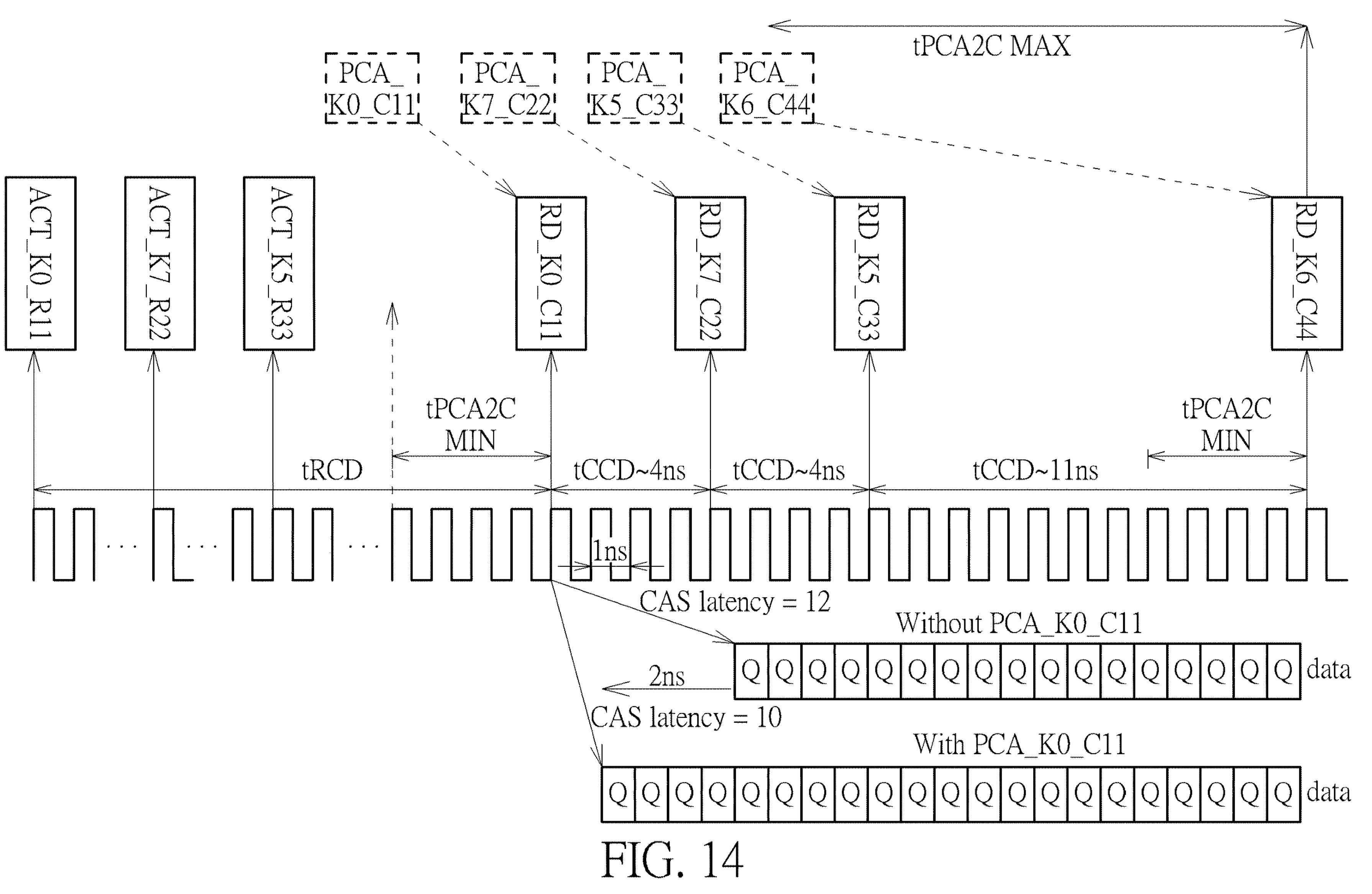

In another embodiment, taking the command processor 150 issuing the pre-column address command PCA_K6_C44 as an example again, as shown in FIG. 14, the pre-column address command PCA_K6_C44 can exceed the previous read command (i.e. the read command RD_K5_C33), but cannot exceed an active command (or pre-charge command if possible) corresponding to the pre-column address command PCA_K6_C44. Also, the issued pre-column address command PCA_K5_C33 can exceed the previous read command (i.e. the read command RD_K7_C22), but cannot exceed an active command (or pre-charge command if possible) corresponding to the pre-column address command PCA_K5_C33.

Figure 15:
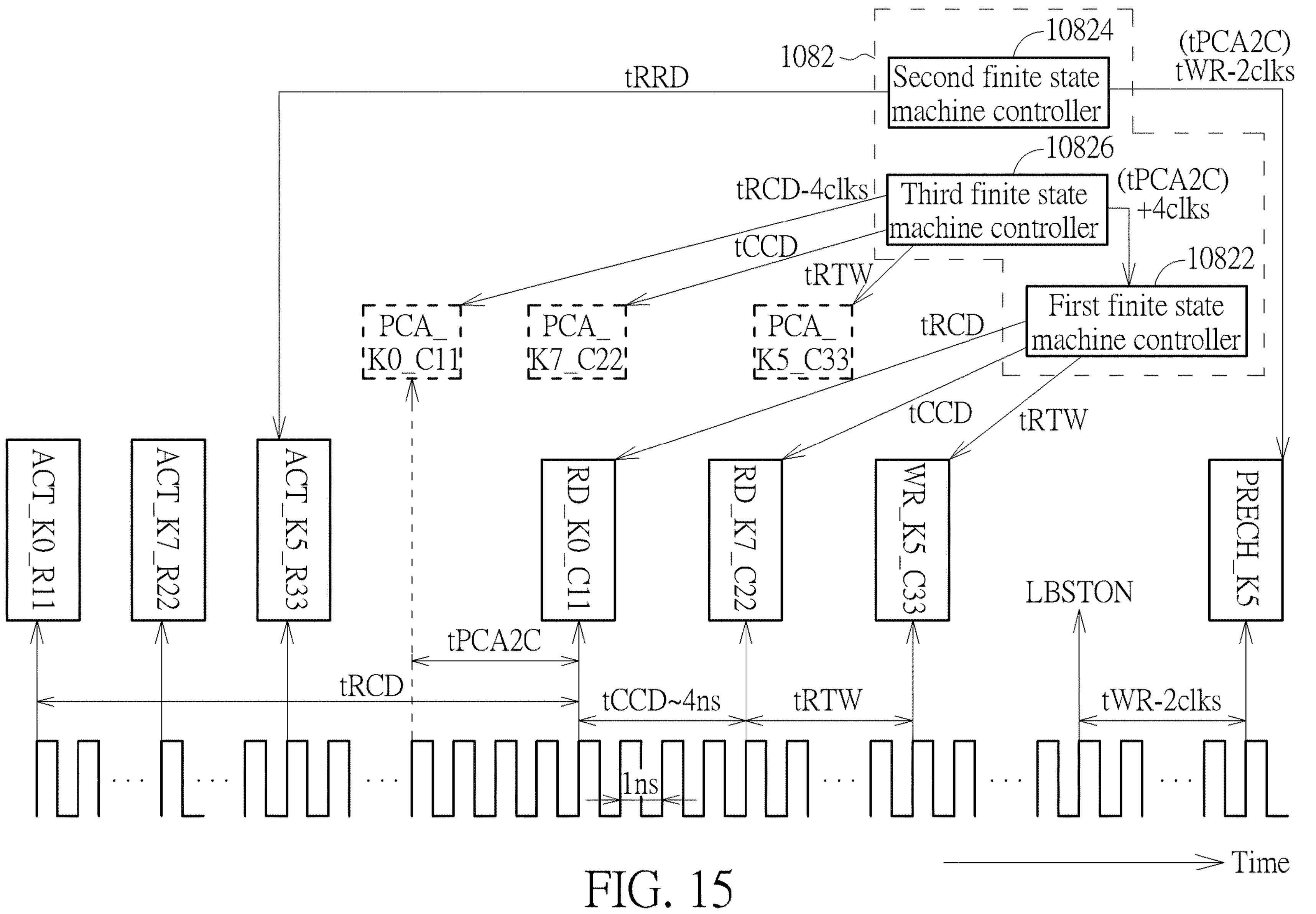
FIG. 15 is a diagram illustrating an operational timing of the finite state machine controlling the command processor according to the present invention.

Next, please refer to FIG. 15. FIG. 15 is a diagram illustrating an operational timing of the finite state machine 1082 controlling the command processor 150 according to the present invention, in which two read commands and one following write command will be issued. As shown in FIG. 15, taking a pre-column address command issued between issuing a corresponding active command and a corresponding read command (or write command), and the pre-column address command not exceeding a previous read command (or a previous write command) as an example, because the command processor 150 can issue the pre-column address commands PCA_K0_C11, PCA_K7_C22, PCA_K5_C33, when the second finite state machine controller 10824 included in the finite state machine 1082 controls the command processor 150 to issue the pre-charge command PRECH_K5, the original time interval tWR period could be reduce to a time interval tWR-2clks before the command processor 150 issuing the pre-charge command PRECH_K5, wherein as shown in FIG. 15, the time interval tWR-2clks exists between the pre-charge command PRECH_K5 and the turning-on time LBSTON of the last bit switch corresponding to the write command WR_K5_C33.

In addition, as shown in FIG. 15, in this embodiment the maximum tPCA2CMAX of the time interval tPCA2C can be equal to the time interval tCCD (between two read commands) or the time interval tRTW (between a previous read command and a next write command). When a third finite state machine controller 10826 included in the finite state machine 1082 controls the command processor 150 to issue the pre-column address command PCA_K0_C11, a time interval tRCD-4clks exists between the pre-column address command PCA_K0_C11 and the active command ACT_K0_R11, wherein the time interval tPCA2C is equal to the minimum tPCA2CMIN (i.e. 4clks); when the third finite state machine controller 10826 controls the command processor 150 to issue the pre-column address command PCA_K7_C22, the time interval tCCD can exist between the pre-column address command PCA_K7_C22 and the read command RD_K7_C22; and when the third finite state machine controller 10826 controls the command processor 150 to issue the pre-column address command PCA_K5_C33, the time interval tRTW can exist between the pre-column address command PCA_K5_C33 and the write command WR_K5_C33. In addition, operational principles of the first finite state machine controller 10822 can be referred to FIG. 7, so further description thereof is omitted for simplicity. In addition, the operational timing in FIG. 15 is only used for (not limited to) describing one embodiment of the present invention.

Figure 16:
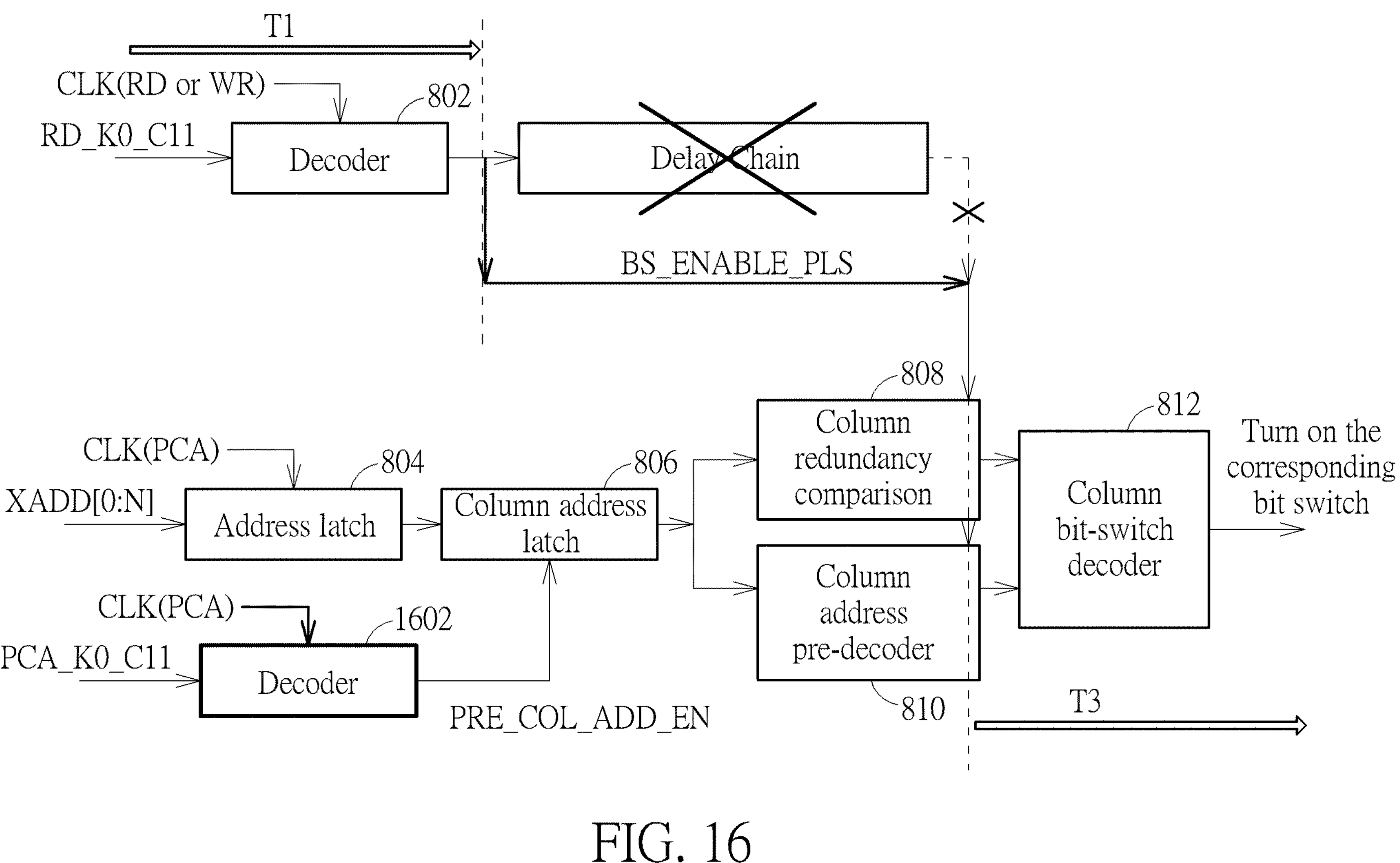
FIG. 16 is a diagram illustrating operation of the memory after the memory receives the read command.

Next, as shown in FIG. 16, taking the command C0 as an example, when the command processor 150 issues the pre-column address command PCA_K0_C11, based on the pin A13 (or other address pins not used in traditional column address) and/or the pre-column address command PCA_K0_C11, a decoder 1602 operating according to a clock CLK(PCA) of the memory M1 can generate a pre-column address enable signal PRE_COL_ADD_EN to the column address latch 806 of the memory M1, and the address latch 804 of the memory M1 latches the address XADD[0:N](such as the address of the bank 0, the address of the row 11, and the address of the column 11), wherein the address latch 804 operates according to the clock CLK (PCA), the column address latch 806 can latch the address of the column 11 and earlier output the address of the column 11 to the column redundancy comparison 808 and the column address pre-decoder 810, resulting in the column redundancy comparison 808 and the column address pre-decoder 810 being ready before (or during) the read command RD_K0_C11 is received by the memory M1, or before (or during) the read command RD_K0_C11 is decoded by the decoder 802.

Figure 8:
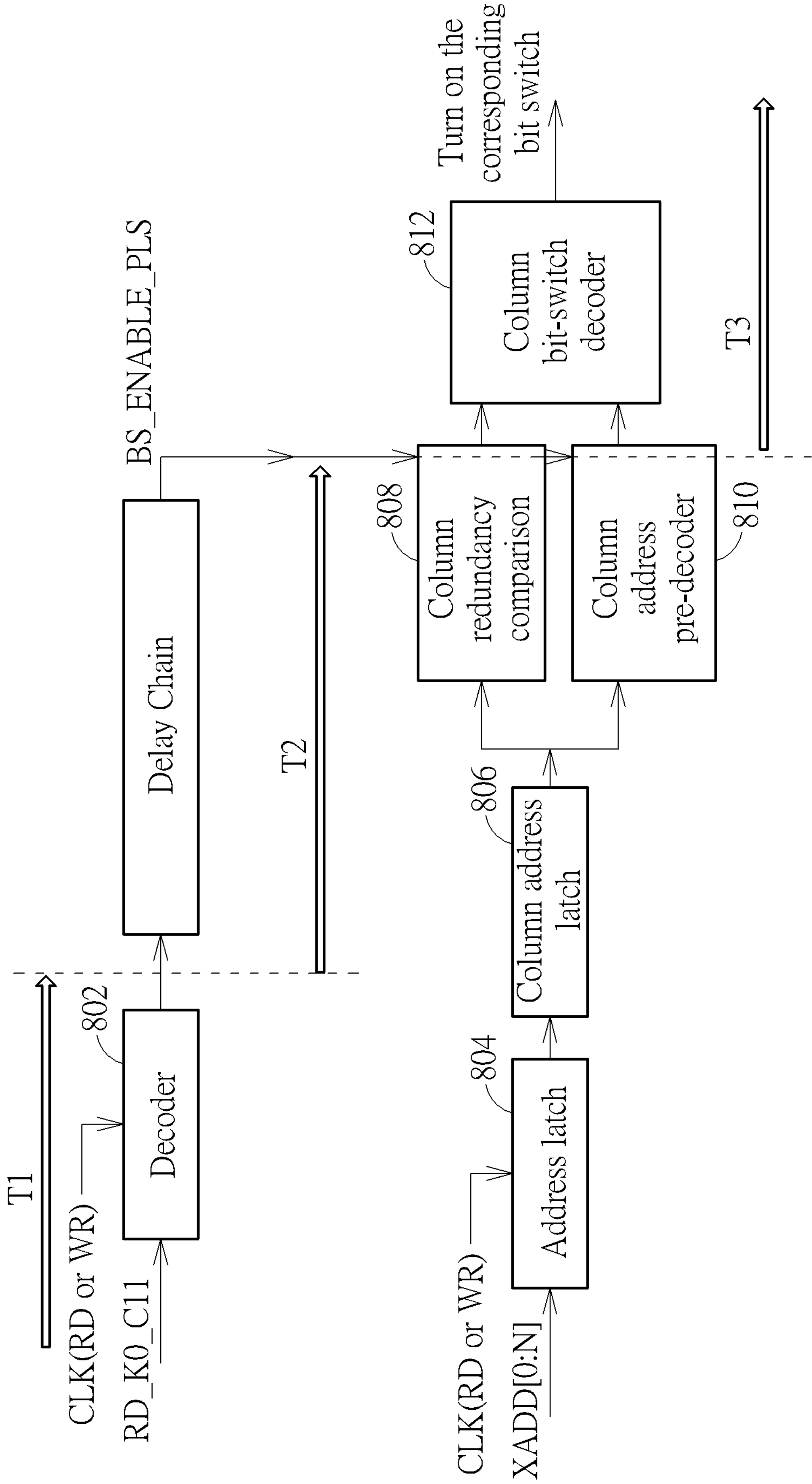
FIG. 8 is a diagram illustrating operation of the memory after the memory receives the read command.

As shown in FIG. 16, because the column redundancy comparison 808 and the column address pre-decoder 810 can be ready before the read command RD_K0_C11 is received by (or decoded by the decoder 802) the memory M1, the delay chain shown in FIG. 8 could be removed in FIG. 16, wherein the delay chain is used to wait for the column address latch 806 latching the address of the column 11, and the column redundancy comparison 808 and the column address pre-decoder 810 being ready. That is, the time interval T2 in FIG. 8 does not exist in FIG. 16.

Figure 17:
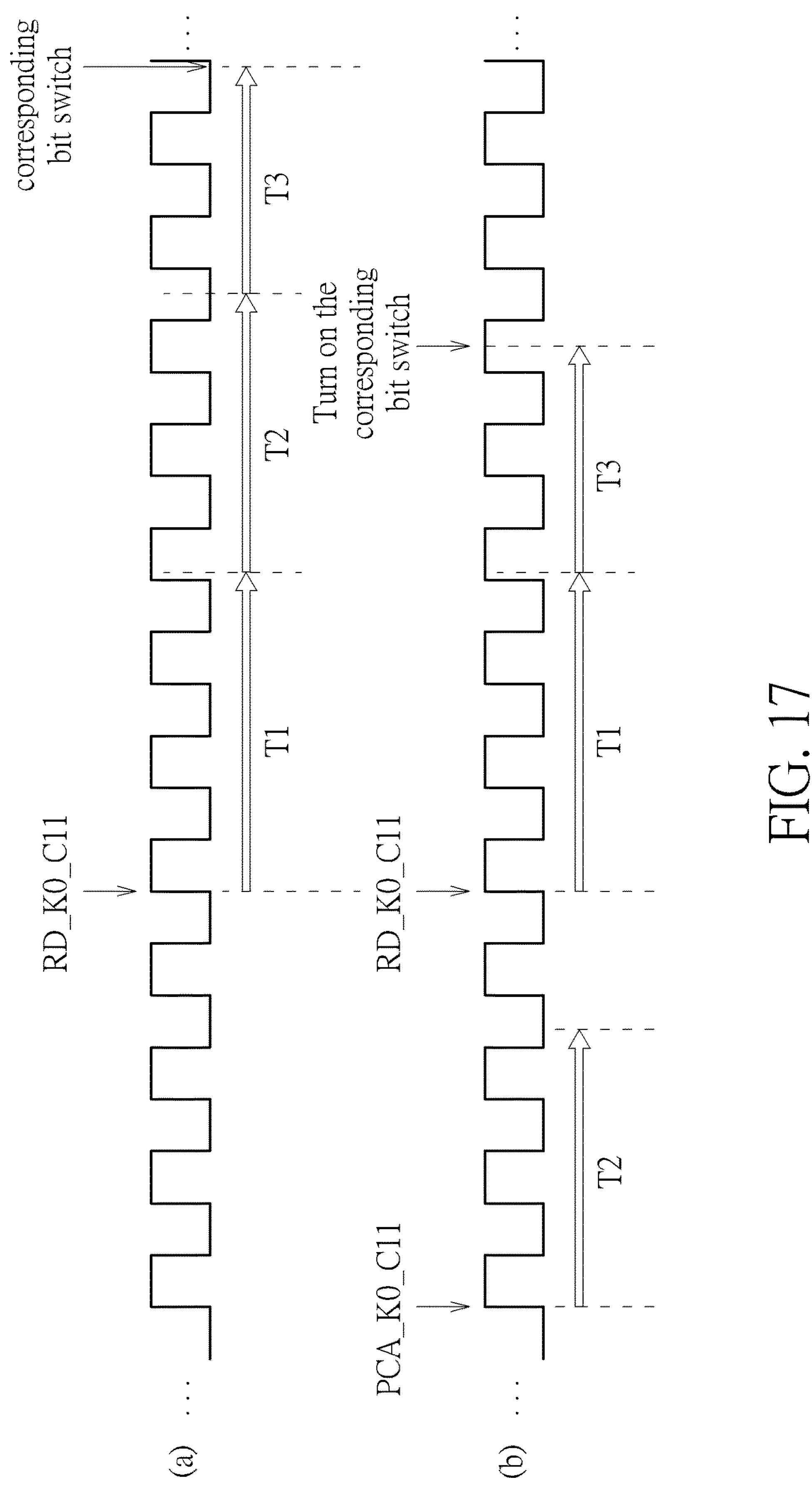
FIG. 17 is a diagram illustrating operational timing of the memory based on the pre-column address command and operational timing of the memory based on the prior art.

Please refer to FIG. 17. FIG. 17 is a diagram illustrating operational timing of the memory M1 based on the pre-column address command PCA_K0_C11 and operational timing of the memory M1 based on the prior art. As shown in FIG. 17(*a*), in the prior art, after the memory M1 receives the read command RD_K0_C11, if the pre-column address command PCA_K0_C11 is not applied to the memory M1, after the memory M1 receives the read command RD_K0_C11, time intervals T1-T3 need to exist before the memory M1 turns on the corresponding bit switch according to the column address data CAD, wherein the time interval T1 is for the memory M1 receiving the read command RD_K0_C11 and decoding the read command RD_K0_C11, the time interval T2 is for the memory M1 latching the column address data CAD, pre-decoding the column address data CAD, and executing the column redundancy comparison 808, and the time interval T3 is for the memory M1 decoding the corresponding bit switch according to the column address data CAD to turn on the corresponding bit switch.

However, as shown in FIG. 17(*b*), after the memory M1 receives the read command RD_K0_C11, if the pre-column address command PCA_K0_C11 is applied to the memory M1, because the memory M1 has decoded the pre-column address command PCA_K0_C11 to obtain the column address data CAD, latched the column address data CAD, pre-decoded the column address data CAD, and executed the column redundancy comparison 808 before the memory M1 receives the read command RD_K0_C11, only the time intervals T1, T3 exist before the memory M1 turns on the corresponding bit switch after the memory M1 receives the read command RD_K0_C11. That is, when the memory M1 receives the read command RD_K0_C11, the memory M1 can quickly turn on the corresponding bit switch according to the column 11.

In addition, the arbitration circuit 104, the sequencing engine 108, and the command processor 150 can be field programmable gate arrays (FPGAs) with the above-mentioned functions of the arbitration circuit 104, the sequencing engine 108, and the command processor 150, or application-specific integrated circuits (ASICs) with the above-mentioned functions of the arbitration circuit 104, the sequencing engine 108, and the command processor 150, or a software module with the above-mentioned functions of the arbitration circuit 104, the sequencing engine 108, and the command processor 150, or analog integrated circuits with the above-mentioned functions of the arbitration circuit 104, the sequencing engine 108, and the command processor 150.

In addition, because one of ordinary skill in the art can input codes of the above-mentioned functions of the arbitration circuit 104, the sequencing engine 108, and the command processor 150 to the field programmable gate arrays (FPGAs), or utilize intellectual property cores (IPs) of the above-mentioned functions of the arbitration circuit 104, the sequencing engine 108, and the command processor 150 to implement the application-specific integrated circuits (ASICs) with the above-mentioned functions of the arbitration circuit 104, the sequencing engine 108, and the command processor 110, and the field programmable gate arrays (FPGAs) and the intellectual property cores (IPs) are obviously ready-made to one of ordinary skill in the art, structures of the arbitration circuit 104, the sequencing engine 108, and the command processor 110 are not necessary to disclose.

To sum up, because the unoccupied time exists between the read or write command and the active command, the present invention can utilize the pre-column address command generating circuit of the command processor to generate the pre-column address command between the read or write command and the active command to the memory, so that compared to the prior art, the memory can utilize the pre-column address command to reduce a time interval between the memory receiving the read or write command and turning on the corresponding bit switch.

Although the present invention has been illustrated and described with reference to the embodiments, it is to be understood that the present invention is not to be limited to the disclosed embodiments, but on the contrary, is intended to cover various modifications and equivalent arrangements included within the spirit and scope of the appended claims.

What is claimed is:

1. A memory system, comprising:

a memory controller comprising a command processor; and a memory coupled to the memory controller, wherein the memory at least comprises a decoder and a column bit-switch decoder;

wherein when an access command is performed by the memory controller, the command processor generates a pre-column address command to the memory before issuing a read command to the memory and after issuing an active command, wherein the pre-column address command comprises a column address information, wherein there is no delay chain circuit between the decoder which is capable for decoding the read command and the column bit-switch decoder;

wherein the pre-column address command, the column address information and the read command are issued by the command processor based on the access command.

2. The memory system of claim 1, wherein the command processor issues the pre-column address command to the memory to latch the column address information before the memory receives the read command.

3. The memory system of claim 2, wherein the column address information and the pre-column address command are generated to the memory within a clock period, or simultaneously generated to the memory.

4. The memory system of claim 2, wherein the pre-column address command and the column address information corresponding to the access command are issued by the memory controller after issuing another read command corresponding to another access command which is performed by the memory controller right before the access command.

* * * * *